United States Patent
Armangau et al.

(10) Patent No.: US 10,838,721 B1
(45) Date of Patent: Nov. 17, 2020

(54) ADAPTIVE THREAD PROCESSING OF IO REQUESTS

(71) Applicant: EMC IP Holding Company LLC, Hopkinton, MA (US)

(72) Inventors: Philippe Armangau, Acton, MA (US); Bruce E. Caram, Hudson, MA (US); Christopher A. Seibel, Walpole, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 559 days.

(21) Appl. No.: 15/086,647

(22) Filed: Mar. 31, 2016

(51) Int. Cl.
| | |
|---|---|
| *G06F 9/30* | (2018.01) |
| *G06F 13/16* | (2006.01) |
| *G06F 13/40* | (2006.01) |
| *G06F 9/46* | (2006.01) |
| *G06F 13/42* | (2006.01) |
| *G06F 11/30* | (2006.01) |

(52) U.S. Cl.
CPC .......... *G06F 9/3009* (2013.01); *G06F 9/461* (2013.01); *G06F 11/3027* (2013.01); *G06F 11/3065* (2013.01); *G06F 13/1642* (2013.01); *G06F 13/4022* (2013.01); *G06F 13/4282* (2013.01)

(58) Field of Classification Search
CPC ...... G06F 9/3009; G06F 9/461; G06F 9/4843; G06F 9/4856; G06F 11/3027; G06F 11/3065; G06F 13/1642; G06F 13/4022; G06F 13/4282; G06F 9/3885; G06F 9/5027; G06F 11/30; G06F 11/3024
See application file for complete search history.

(56) References Cited

U.S. PATENT DOCUMENTS

| | | | |
|---|---|---|---|
| 7,051,330 B1 * | 5/2006 | Kaler | G06F 9/4843 709/203 |
| 7,178,145 B2 | 2/2007 | Bono | |
| 7,882,061 B1 | 2/2011 | Kast | |
| 7,996,848 B1 | 8/2011 | McClure et al. | |
| 8,327,378 B1 | 12/2012 | Vasanthakumari et al. | |
| 8,752,057 B1 | 6/2014 | Gould et al. | |
| 8,832,698 B1 | 9/2014 | Chai | |
| 9,378,052 B1 | 6/2016 | Dou et al. | |
| 9,411,636 B1 | 8/2016 | Ting et al. | |
| 9,460,025 B1 | 10/2016 | Wallace et al. | |
| 2006/0026214 A1 * | 2/2006 | Berg | G06F 9/5027 |
| 2007/0124728 A1 * | 5/2007 | Rosenbluth | G06F 9/526 718/100 |
| 2015/0205632 A1 * | 7/2015 | Gaster | G06F 9/4843 718/102 |
| 2015/0355936 A1 * | 12/2015 | Zheng | G06F 9/4881 718/108 |

FOREIGN PATENT DOCUMENTS

WO     WO 98/38559     9/1998

\* cited by examiner

*Primary Examiner* — Aimee Li
*Assistant Examiner* — Kasim Alli
(74) *Attorney, Agent, or Firm* — BainwoodHuang (57) ABSTRACT

A technique for processing IO (Input/Output) requests includes executing a first set of instructions for processing an IO request using a first thread on a CPU core and providing the first thread with an option, based on how busy the CPU core is, either (i) to execute a second set of instructions for further processing the IO request itself or (ii) to pass the IO request to a second thread on the CPU core, such that the second thread executes the second set of instructions instead of the first thread.

13 Claims, 5 Drawing Sheets

ADAPTIVE THREAD PROCESSING OF IO REQUESTS

BACKGROUND

Data storage systems are arrangements of hardware and software that include one or more storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, or deleted, for example. Software running on the storage processors manages incoming storage requests and performs various data processing tasks to organize and secure the data elements stored on the non-volatile storage devices.

Storage processors in data storage systems commonly contain multiple CPU (Central Processing Unit) cores, and each core is capable of executing multiple threads simultaneously. In one example, a system thread runs on a CPU core in a storage processor. The system thread picks up newly-arriving storage requests, e.g., received from hosts, and processes the requests. For example, in response to the storage processor receiving a write request specifying data to be written to the data storage system, the system thread may execute instructions that place newly arriving host data in a data log. Sometimes, in the course of executing the instructions, the system thread attempts to access a resource that has been locked. In such cases, the system thread may pass processing of the write request to another thread. The system thread may then resume its processing of newly arriving host requests, while the other thread waits for the lock to be removed.

SUMMARY

Use of a single thread for processing IO (Input/Output) requests from hosts is thought to promote efficiency because it avoids the high cost of context switching, which is required any time a CPU core passes operation from one thread to another. An exception to this single thread preference is where a thread encounters a locked resource, as described above, in which case the cost of context switching may be justified by efficiencies gained, i.e., by using a second thread to wait for the lock to be removed instead of tying up the system thread.

Unfortunately, the efficiency of a single thread can fall precipitously when the CPU core on which the thread runs becomes busy. Such reduction in efficiency, which may be measured, for example, in CPI (Cycles Per Instruction), is believed to derive from increased competition for core resources, such as registers, cache, and memory. As a consequence, the same thread, which may run with low average CPI (high efficiency) when the CPU core is relatively free, can run much higher average CPI (less efficiency) when the CPU core is busy. However, we have recognized that breaking up sequential processing of each IO request into multiple threads can greatly mitigate the increase in CPI, even when the cost of context switching is considered.

In contrast with the prior approach, which typically uses a single thread to process IO requests, an improved technique for processing IO (Input/Output) requests executes a first set of instructions for processing an IO request using a first thread on a CPU core and provides the first thread with an option, based on how busy the CPU core is, either (i) to execute a second set of instructions for further processing the IO request itself or (ii) to pass the IO request to a second thread on the CPU core, such that the second thread executes the second set of instructions instead of the first thread.

Advantageously, the improved technique allows a storage processor adaptively to use either one thread or two for processing the two sets of instructions based on how busy the CPU core is, such that the storage processor can use a single thread when doing so is more efficient, as it avoids the cost of context switching, and can use two threads when doing so is more efficient, as the cost of context switching is justified. As a consequence, the storage processor operates more efficiently than it would if it always used one thread or always used two. In an example, improvements in efficiency may be experienced not only by the storage processor, but also by hosts, which receive acknowledgements to their IO requests more quickly than they would if the storage processor were to execute instructions more slowly. Host applications thus run more efficiently, and end-users of host applications enjoy an improved user experience.

Certain embodiments are directed to a method of processing IO (Input/Output) requests in a data storage system. The method includes, in response to receiving a first IO request specifying first data to be written to the data storage system, (i) executing, by a first thread running on a CPU (Central Processing Unit) core in the data storage system, a first set of instructions for performing initial processing of the first IO request and (ii) after executing the first set of instructions and in response to a core-busyness indicator having a first value, executing, by the first thread, a second set of instructions for performing further processing of the first IO request. The method further includes, in response to receiving a second IO request specifying second data to be written to the data storage system, (i) executing, by the first thread, the first set of instructions for performing the initial processing of the second IO request and (ii) after executing the first set of instructions for the second IO request and in response to the core-busyness indicator having a second value, executing, by a second thread on the CPU core, the second set of instructions for performing the further processing of the second IO request. The second value of the core-busyness indicator indicates a greater degree of busyness of the CPU core than does the first value of the core-busyness indicator.

Other embodiments are directed to a data storage system constructed and arranged to perform a method of processing IO requests, such as the method described above. Still other embodiments are directed to a computer program product. The computer program product stores instructions which, when executed by control circuitry of a data storage system, cause the data storage system to perform a method of processing IO requests, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to be in any way limiting.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique executes a first set of instructions for processing an IO request using a first thread on a CPU core and provides the first thread with an option, based on how busy the CPU core is, either (i) to execute a second set of instructions for further processing the IO request itself or (ii) to pass the IO request to a second thread on the CPU core, such that the second thread executes the second set of instructions instead of the first thread.

Figure 1:
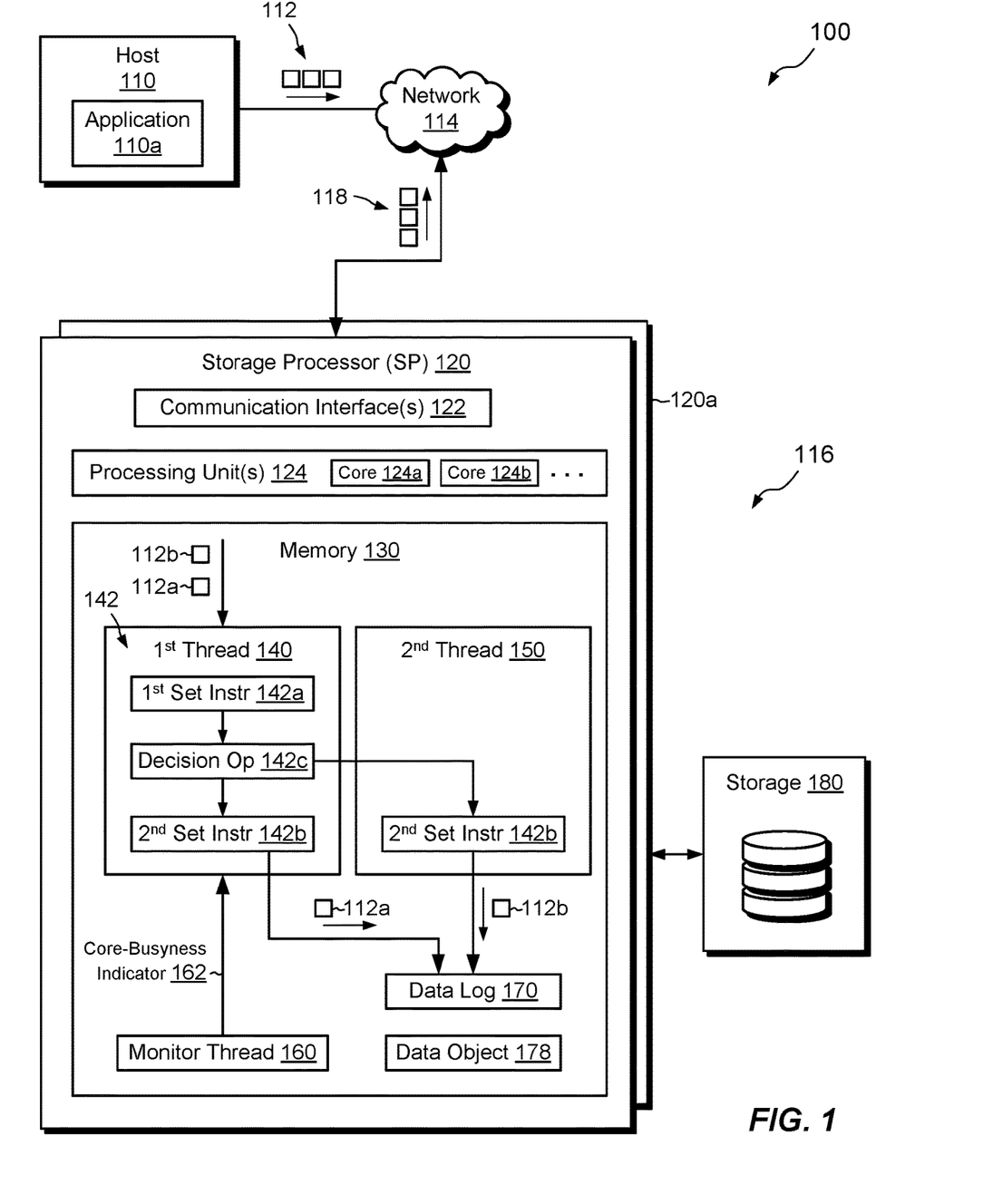
FIG. 1 is block diagram of an example environment in which the improved technique hereof can be practiced.

FIG. 1 shows an example environment 100 in which embodiments of the improved technique hereof can be practiced. Here, a host computing device ("host") 110 connects to a data storage system 116 over a network 114. The host 110 runs a host application 110*a*. In some arrangements, multiple hosts 110 are present, with each host running its own host application 110*a* and with the host applications accessing the data storage system 116 over the network 114 in parallel.

The data storage system 116 includes a storage processor, or "SP," 120 and storage 180, such as magnetic disk drives, electronic flash drives, and the like. The data storage system 116 may include multiple SPs like the SP 120 (e.g., a second SP, 120*a*). In an example, multiple SPs may be provided as circuit board assemblies, or "blades," which plug into a chassis that encloses and cools the SPs. The chassis has a backplane for interconnecting the SPs, and additional connections may be made among SPs using cables. No particular hardware configuration is required, however, as any number of SPs, including a single SP, may be provided and the SP 120 can be any type of computing device capable of processing host IOs.

The network 114 may be any type of network or combination of networks, such as a storage area network (SAN), a local area network (LAN), a wide area network (WAN), the Internet, and/or some other type of network or combination of networks, for example. The host 110 may connect to the SP 120 using various technologies, such as Fibre Channel, iSCSI, NFS, SMB 3.0, and/or CIFS, for example. As is known, Fibre Channel and iSCSI are block-based protocols, whereas NFS, SMB 3.0, and CIFS are file-based protocols. The SP 120 is configured to receive IO requests 112 according to block-based and/or file-based protocols and to respond to such IO requests 112 by reading or writing the storage 180. The SP 120 provides an acknowledgement 118 back to the host application 110 for each IO request 112 specifying a data write once that write is complete.

The SP 120 includes one or more communication interfaces 122, a set of processing units 124, and memory 130. The communication interfaces 122 include, for example, SCSI target adapters and/or network interface adapters for converting electronic and/or optical signals received over the network 114 into electronic form for use by the SP 120. The set of processing units 124 includes one or more CPU cores 124*a*, 124*b*, and so on, along with associated coprocessors and chipsets. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

The memory 130 includes a data log 170 and a data object 178. In an example, the data log 170 supports the data object 178 by temporarily storing host data to be written to the data object 178. The data object 178 may take the form of a LUN (Logical UNit), file system, or VVol (Virtual Volume), for example. In an example, the data log 170 is implemented with data and metadata that reside in storage 180 but which are loaded, in whole or in part, into the memory 130. The data log 170 may periodically flush to the data object 178, thus freeing space in the data log 170 and enabling it to accept new host data. Although only a single data log 170 and a single data object 178 are shown, it should be appreciated that the data storage system 116 may include any number of data logs 170 and data objects 178. The example shown is merely illustrative.

As further shown in FIG. 1, multiple threads run within memory 130. These include a first thread 140, a second thread 150, and a third thread (monitor thread) 160. In an example, the threads 140, 150, and 160 are core-affined, meaning that they all run on a single CPU core, such as on the core 124*a*. Typically, all three threads 140, 150, and 160 run together at the same time; however, this is not required. For instance, the SP 120 may create the first thread 140 before it creates the second thread 150. In some examples, the SP 120 creates threads as needed. In other examples, the SP 120 creates a pool of threads that are always running and available for use.

In example operation, the host application 110*a* issues IO requests 112 to the data storage system 116. The SP 120 receives the IO requests 112 at the communication interfaces 122 and initiates further processing. The IO requests 112 include requests specifying writes to the data object 178, such as write requests 112*a* and 112*b*.

Upon receipt by the SP 120 of IO request 112*a* from the host application 110*a*, the first thread 140 begins processing the IO request 112*a* by executing a first set of instructions 142*a*. For example, the first set of instructions 142*a* performs checking for validity of the IO request 112*a* and other initial processing steps. Once execution of the first set of instructions 142*a* is complete, the first thread 140 performs a decision operation 142*c*. The decision operation 142*c* is based on a core-busyness indicator 162 and either (i) allows operation to continue by the first thread 140, such that the first thread 140 executes a second set of instructions 142b itself, or (ii) directs operation to continue on the second thread 150, such that the second thread 150 executes the second set of instructions 142b. The second set of instructions 142b is the same regardless of whether it is run by the first thread 140 or by the second thread 150. In an example, the second set of instructions 142b involves writing data specified by IO request 112a to the data log 170.

In the case of processing IO request 112a, the core-busyness indicator 162 has a first value, e.g., NOT_BUSY, and the decision operation 142c directs the second set of instructions 142b to be executed for IO request 112a locally. The first thread 140 executes the second set of instructions 142b, which includes directing data specified in IO request 112a to be written to the data log 170. Once the write to the data log 170 is complete, the first thread 140 may obtain another IO request 112 and repeat the above process.

This type of operation, in which the first thread 140 processes IO request 112a on its own, may be described as "synchronous," as the first thread 140 processes the IO request 112a to completion (write to the log) before obtaining another IO request and repeating. Operation may also be "asynchronous," however, as described in connection with IO request 112b.

For example, upon receiving IO request 112b, the first thread 140 executes the first set of instructions 142a, e.g., to check for errors in IO request 112b and to perform other initial processing. The first thread 140 then performs decision operation 142c, again, based on the core-busyness indicator 162. This time, however, the core-busyness indicator 162 has a second value, e.g., BUSY, and the decision operation 142c directs the second set of instructions 142b to be executed for IO request 112b by the second thread 150. If no second thread 150 currently exists, the SP 120 may create one. The second thread 150 then executes the second set of instructions 142b, which includes directing data specified in IO request 112b to be written to the data log 170. This type of operation is described as "asynchronous" because the first thread 140, having passed processing of the IO request 112b to the second thread 150, can immediately obtain another IO request and begin processing it, even though the second thread may still be executing the second set of instructions 142b on the IO request 112b.

In an example, the monitor thread 160 generates the core-busyness indicator 162 by monitoring a set of heuristics relating to the busyness of the core 124a. In an example, the core-busyness indicator 162 is a Boolean, which can be either BUSY or NOT_BUSY, and which is represented in the memory 130 as a global variable accessible to the first thread 140. Alternatively, the core-busyness indicator 162 may be an integer or a floating point number, or even multiple numbers. Although the core-busyness indicator 162 is generated by the monitor thread 160 in the example shown, the indicator 162 may alternatively be generated elsewhere, such as by the first thread 140. Use of a separate monitor thread 160 is believed to promote efficiency, however, by off-loading the work of generating the core-busyness indicator 162 from the first thread 140.

In an example, and as shown in the first thread 140, the first set of instructions 142a, the second set of instructions 142b, and the decision operation 142c are all part of a larger set of instructions 142. The decision operation 142c may be placed anywhere relative to this larger set of instructions 142 and effectively defines a boundary between the first set of instructions 142a and the second set of instructions 142b. In one example, the decision operation 142c is placed at an approximate midpoint of instructions 142. In another example, the decision operation 142c is placed prior to an instruction that takes a lock on a resource, such that processing of IO requests may pass to the second thread 150 at the same point at which operation would be passed if the resource were locked. In yet another example, the decision operation 142c is placed at a location where a particular phase of processing an IO request is complete, such that the IO request is in good condition to be handed off to another thread. These are merely examples, however. Designers may wish to experiment with placement of the decision operation 142c relative to the instructions 142 to identify a placement that results in highest gains in efficiency.

By using the above-described decision operation 140, the improved technique enables the SP 120 to process IO requests 112 asynchronously when the CPU core 124 is busy and to process them synchronously when the CPU core 124a is not busy. Processing thus dynamically adapts to changes in core busyness, with threads adjusting behavior to use the most efficient approach for the current circumstances.

Figure 2:
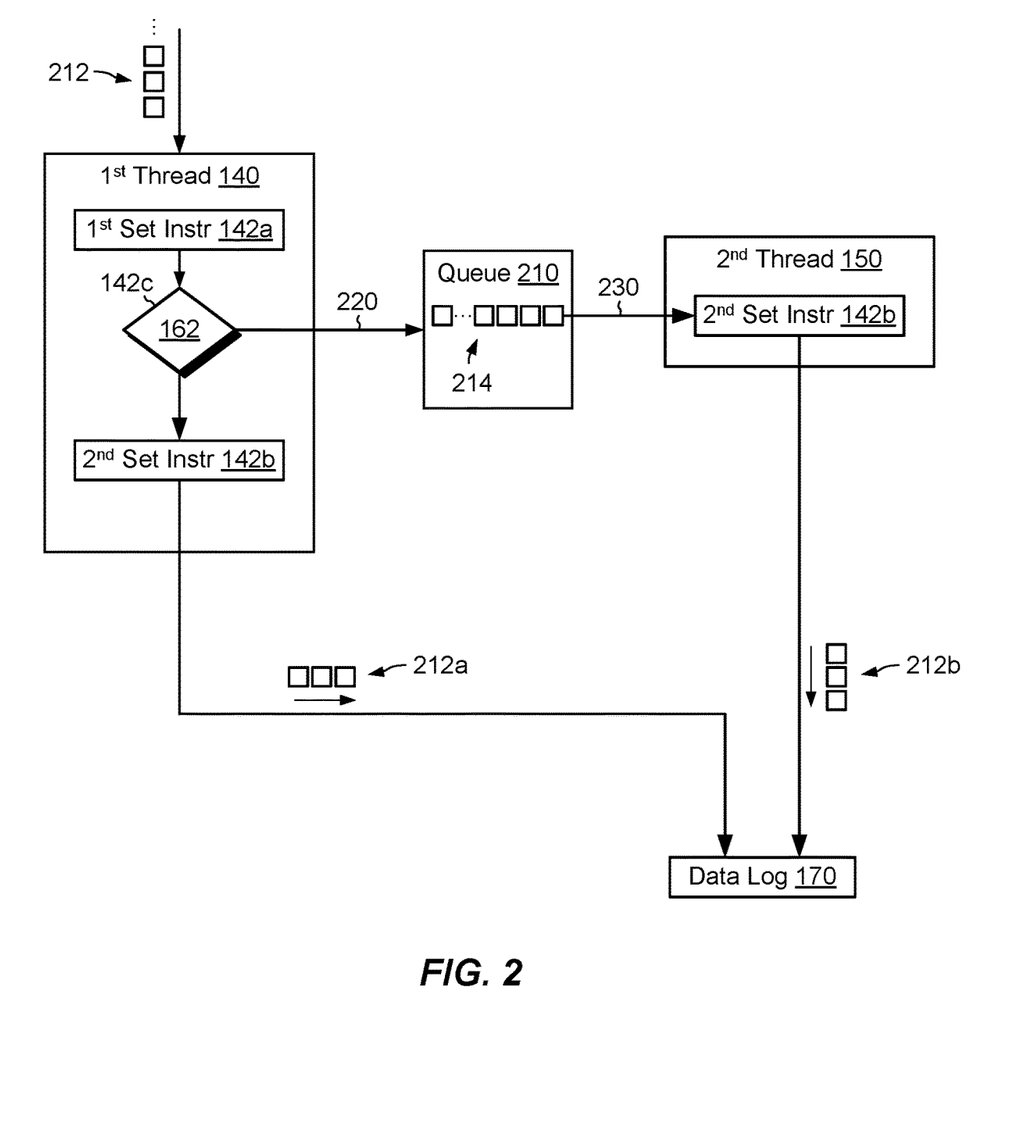
FIG. 2 is a block diagram showing an example arrangement for adaptive thread processing.

FIG. 2 shows additional example features related to adaptive thread processing. Here, the first thread 140 receives multiple IO requests 212 each specifying a respective write of host data to the data object 178 (FIG. 1). From among the IO requests 212, some IO requests 212a are processed synchronously, i.e., one after another and each entirely by the first thread 140, whereas other IO requests 212b are processed asynchronously, i.e., with the first thread 140 executing the first set of instructions 142a and the second thread 150 executing the second set of instructions 142b. Each time decision operation 142c passes processing of an IO request 212b to the second thread 250 (e.g., when the core-busyness indicator is BUSY), it posts an identifier 214 of the IO request 212b in a queue 210, which may be configured as a FIFO (First-In, First-Out). The queue 210 may accumulate multiple identifiers 214. In an example, the identifiers 214 provide definitions of the IO requests 212a, which enable the second thread 150 to obtain the IO requests 212a and process them. At this time, the IO requests 212a may themselves be stored elsewhere, such as at other locations in memory 130 or in a local memory of a communication interface 122.

In an example, when the first thread 140 processes an IO request 212b asynchronously (BUSY), the first thread 140 may post an identifier 214 to the queue and immediately fetch a new IO request 212 and repeat. As long as the core-busyness indicator 162 remains BUSY, the first thread 140 may continue fetching new IO requests 212, executing the first set of instructions 142a, and posting corresponding indicators 214 onto the queue 210. Meanwhile, the second thread 150 may fetch indicators 214 from the queue 210 and execute the second set of instructions 142b on the referenced IO requests 212b. Thus, for example, assuming the BUSY condition is sustained, the first thread 140 may deposit identifiers 214 at a first rate 220, and the second thread 150 may consume them at a second rate 230. Although these rates 220 and 230 may balance out over long periods of time, there is no need for them to remain equal over short periods of time. For example, the first rate 220 may temporarily exceed the second rate 230, causing the number of indicators 214 in the queue 210 to grow. Sometime later, the second rate 230 may temporarily exceed the first rate 220, causing the number of indicators 214 in the queue 210 to shrink. Thus, when processing IO requests 212b asynchronously, the first thread 140 and the second thread 150 may operate largely independently of each other.

In contrast, when the first thread 140 processes IO requests 212a synchronously (NOT_BUSY), the first thread 140 processes each IO request 212a to completion (e.g., write to the data log 170) before obtaining the next IO request. Such synchronous operation avoids context switching and thus promotes efficiency, as long as the CPU core 124a is not very busy. It should be appreciated that operation switches between synchronous and asynchronous as the value of the core-busyness indicator 162 changes.

Figure 3:
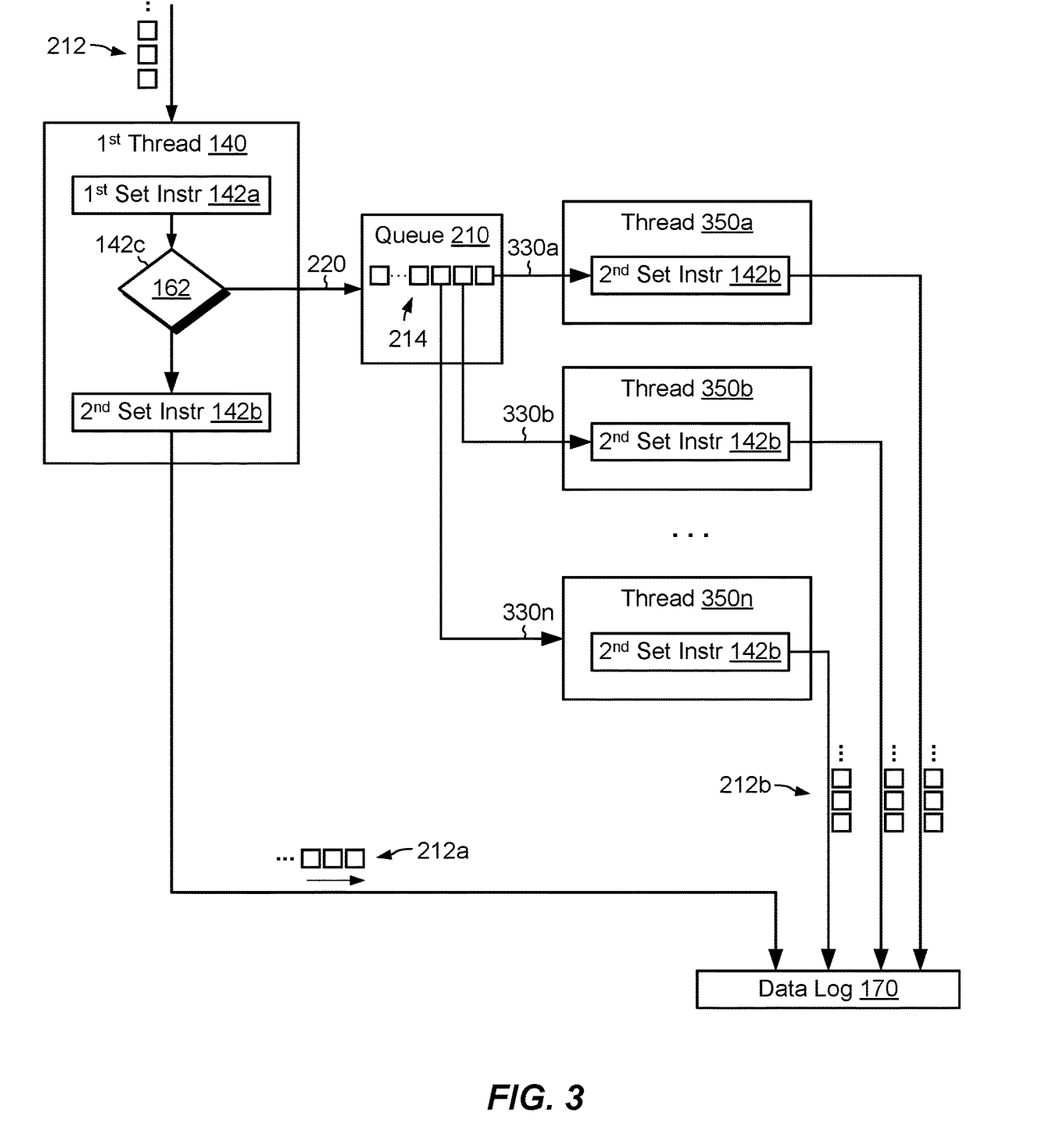
FIG. 3 is a block diagram showing another example arrangement for adaptive thread processing.

FIG. 3 shows further example features related to adaptive thread processing. The arrangement of FIG. 3 is similar to that of FIG. 2, except that, here, multiple threads 350a to 350n are provided for executing the second set of instructions 142b. Each of the threads 350a to 350n may operate independently of the others and independently of the first thread 140. The first thread 140 may post indicators 214 on the queue 210 at rate 220, and the threads 350a to 350n may fetch indicators 214 from the queue 210 at respective rates 330a to 330n. The rates 330a to 330n may differ from one another. Also, the sum of rates 330a to 330n may temporarily differ from the rate 220. The threads 330a to 330n are also core-affined to the CPU core 124a, i.e., they run on the same core as do the first thread 140 and the monitor thread 160.

Figure 4:
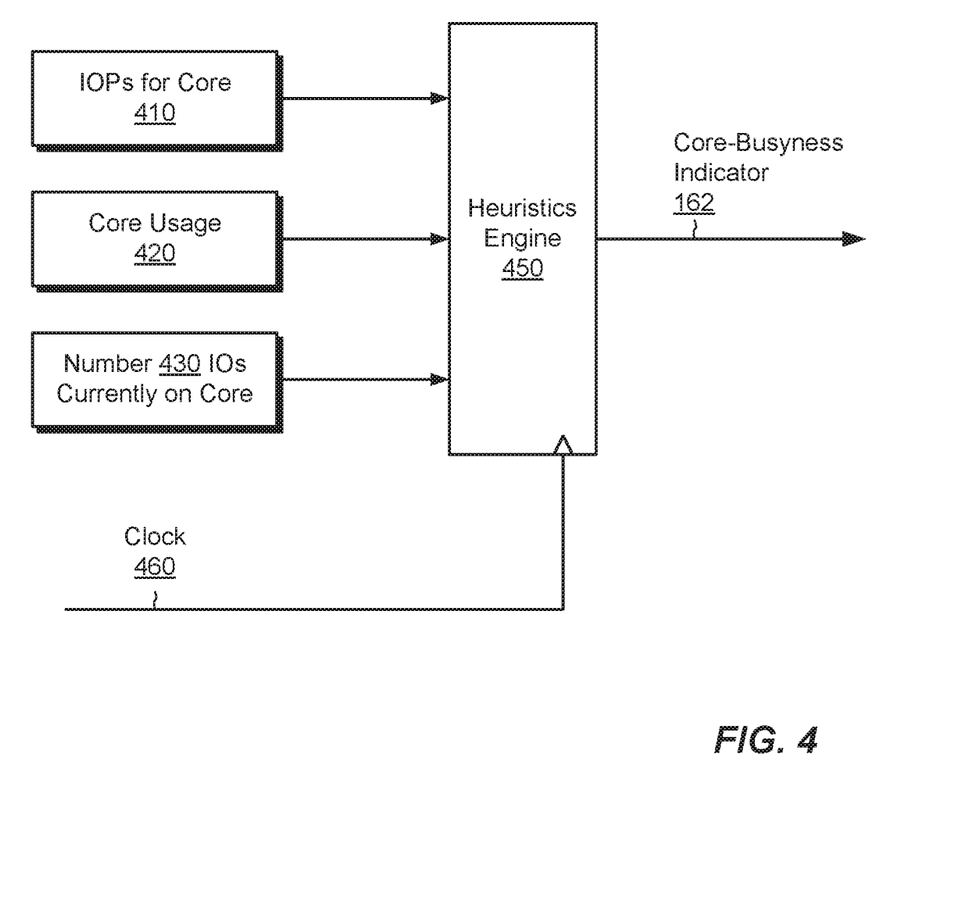
FIG. 4 is a block diagram of an example heuristics engine arranged to generate a core-busyness indicator.

FIG. 4 shows an example implementation of a heuristics engine 450. In an example, the heuristics engine is operated by the monitor thread 160. As shown, the heuristics engine 450 receives a set of inputs and generates, in response to the inputs, the core-busyness indicator 162. In this example, the inputs include (i) a number of IO requests per second (IOPs) 410 processed by the CPU core 124a, (ii) a core usage metric 420, such as a percent-CPU utilization of the core 124a, and (iii) a number 430 of IO requests currently being processed by the CPU core 124a. These inputs are intended to be illustrative, as greater, fewer, or different inputs may be considered, such as those pertaining to cache, memory usage, and so forth. In a particular example, the set of heuristics includes the number 430 of IO requests only. As indicated by clock 460, the heuristics engine 450 may refresh the core-busyness indicator 162 on a regular basis, such as once per second, once per 100 milliseconds, or once per millisecond, for example.

Figure 5:
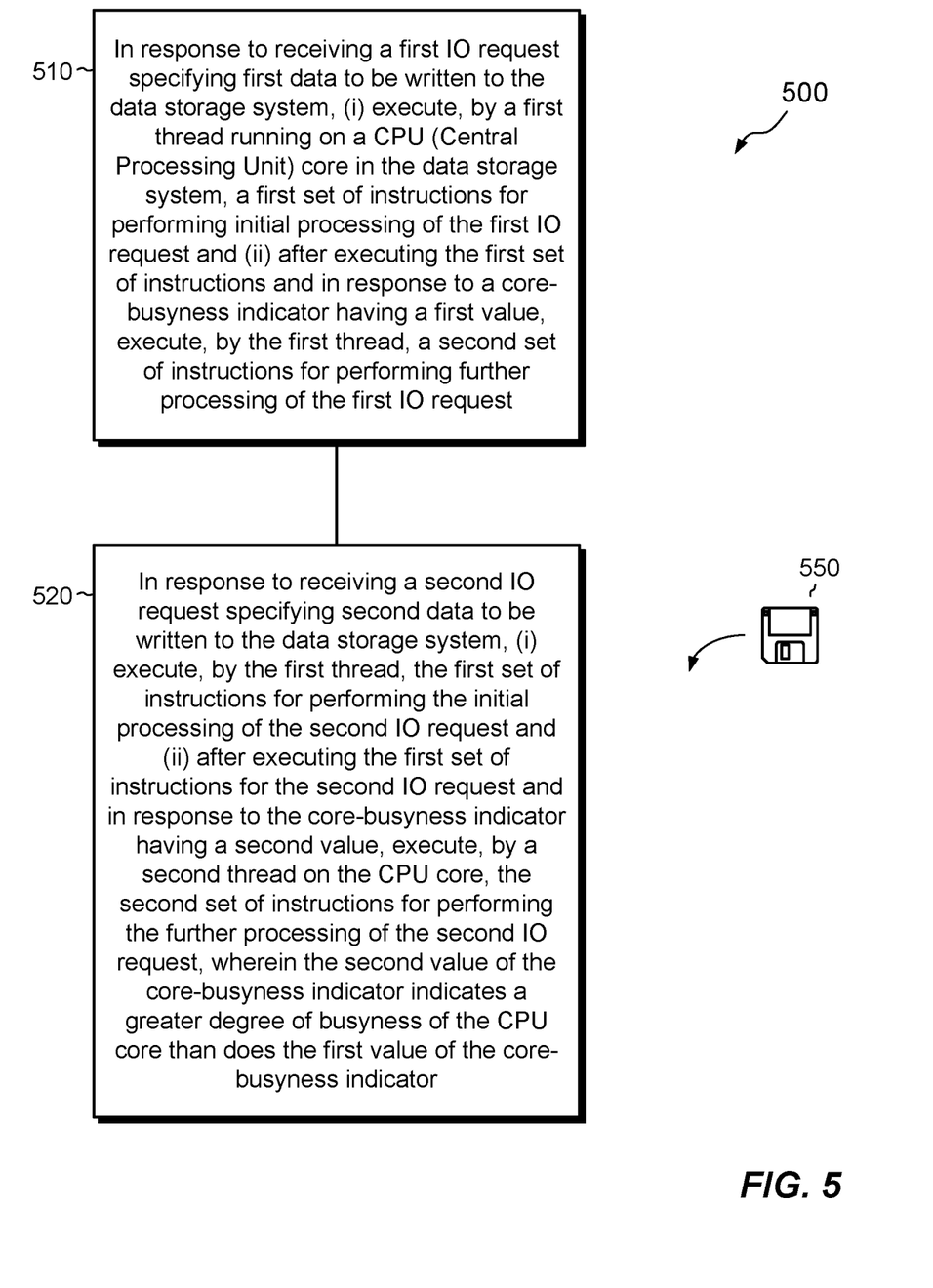
FIG. 5 is a flowchart showing an example method of processing IO (Input/Output) requests in a data storage system.

FIG. 5 shows an example process 500 that may be carried out in connection with the data storage system 116. The process 500 is typically performed by the software constructs, described in connection with FIGS. 1-3, which reside in the memory 130 of the storage processor 120 and are run by the set of processing units 124. The various acts of the process 500 may be ordered in any suitable way. Accordingly, embodiments may be constructed in which acts are performed in orders different from that illustrated, which may include performing some acts simultaneously, even though the acts are shown as sequential in the illustrated embodiments. Also, the word "process" as used in connection with the process 500 refers to a method and is not required to involve the use of a software process, although the use of software processes herein is not excluded.

At 510, in response to receiving a first TO request 112a specifying first data to be written to the data storage system 116, the process 500 includes (i) executing, by a first thread 140 running on a CPU (Central Processing Unit) core 124a in the data storage system 116, a first set of instructions 142a for performing initial processing of the first TO request 112a and (ii) after executing the first set of instructions 142a and in response to a core-busyness indicator 162 having a first value (e.g., NOT_BUSY), executing, by the first thread 140, a second set of instructions 142b for performing further processing of the first TO request 112a.

At 520, in response to receiving a second TO request 112b specifying second data to be written to the data storage system 116, the process 500 includes (i) executing, by the first thread 140, the first set of instructions 142a for performing the initial processing of the second TO request 112b and (ii) after executing the first set of instructions 142a for the second TO request 112b and in response to the core-busyness indicator 162 having a second value (e.g., BUSY), executing, by a second thread 150 on the CPU core 124a, the second set of instructions 142b for performing the further processing of the second TO request 112b, wherein the second value of the core-busyness indicator 162 indicates a greater degree of busyness of the CPU core 124a than does the first value of the core-busyness indicator 162.

An improved technique has been described for processing TO requests. The improved technique executes a first set of instructions 142a for processing an TO request using a first thread 140 on a CPU core 124a and provides the first thread 140 with an option, based on how busy the CPU core is, either (i) to execute a second set of instructions 142b for further processing the TO request itself or (ii) to pass the TO request to a second thread 150 on the CPU core 124a, such that the second thread 150 executes the second set of instructions 142a instead of the first thread.

The improved technique allows SP 120 adaptively to use either one thread or two for processing the two sets of instructions based on how busy the CPU core is, such that the storage processor can use a single thread when doing so is more efficient, as it avoids the cost of context switching, and can use two threads when doing so is more efficient, when the cost of context switching is justified.

Having described certain embodiments, numerous alternative embodiments or variations can be made. For example, embodiments have been shown and described for executing a first set of instructions 142a and a second set of instructions 142b for the purpose of writing data specified in IO requests 112 to a data log 170. However, this is merely an example, as the techniques described herein may be used in any data storage context. In addition, the techniques described may be used for processing IO requests specifying reads as well as writes.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of processing IO (Input/Output) requests in a data storage system, the method comprising:
   in response to receiving a first IO request specifying first data to be written to the data storage system, (i) executing, by a first thread running on a CPU (Central Processing Unit) core in the data storage system, a first set of instructions for performing initial processing of the first IO request and (ii) after executing the first set of instructions and in response to a core-busyness indicator having a first value, executing, by the first thread, a second set of instructions for performing further processing of the first IO request; and
   in response to receiving a second IO request specifying second data to be written to the data storage system, (i) executing, by the first thread, the first set of instructions for performing the initial processing of the second IO request and (ii) after executing the first set of instructions for the second IO request and in response to the core-busyness indicator having a second value, executing, by a second thread on the CPU core, the second set of instructions for performing the further processing of the second IO request,
   wherein the second value of the core-busyness indicator indicates a greater degree of busyness of the CPU core than does the first value of the core-busyness indicator, and
   wherein executing the second set of instructions by the second thread on the CPU core involves context switching from the first thread to the second thread when the core-busyness indicator indicates the greater degree of busyness, the context switching enabling the CPU core to operate more efficiently than it would without context switching,
   wherein the method further comprises, in response to receiving the second IO request, performing a decision operation by the first thread, the decision operation configured to direct execution of the second set of instructions by one of the first thread and the second thread based on the core-busyness indicator, wherein the method further comprises generating the core-busyness indicator based on a set of heuristics pertaining to a busyness of the CPU core, wherein the core-busyness indicator is generated by a third thread running on the CPU core, the third thread obtaining the set of heuristics by monitoring activity of the CPU core, and wherein the set of heuristics includes a number of IO requests currently being processed by the CPU core.

2. The method of claim 1, further comprising updating the core-busyness indicator at a rate of at least once per second.

3. The method of claim 1, further comprising, upon performing the decision operation with the core-busyness indicator having the second value, directing execution of the second set of instructions by the second thread by placing an indicator of the second IO request onto a queue accessible by the second thread, to enable the second thread to obtain the indicator of the second IO request from the queue and to execute the second set of instructions for the second IO request.

4. The method of claim 3, further comprising:
   receiving additional IO requests each specifying a write of respective data to the data storage system;
   executing the first set of instructions by the first thread for each of the additional IO requests; and
   in response to the busyness indicator having the second value, (i) placing indicators for the additional IO requests onto the queue and (ii) obtaining the indicators from the queue by multiple additional threads to enable the additional threads to execute the second set of instructions for the additional IO requests.

5. The method of claim 4, wherein the acts of (i) placing, by the first thread, the indicators for the additional IO requests onto the queue and (ii) obtaining, by the additional threads, the indicators from the queue are performed asynchronously, such that, over a given time interval, a first rate at which the first thread places the indicators onto the queue differs from a second rate at which the additional threads obtain the indicators from the queue.

6. The method of claim 3, further comprising:
   receiving additional IO requests each specifying a write of respective data to the data storage system; and
   in response to the busyness indicator having the first value, executing, by the first thread, both the first set of instructions and the second set of instructions for each of the additional IO requests.

7. The method of claim 1, further comprising:
   performing context switching from the first thread to the second thread when processing IO requests, in response to the core-busyness indicator indicating a higher level of busyness; and
   avoiding context switching from the first thread to the second thread when processing IO requests, in response to the core-busyness indicator indicating a lower level of busyness.

8. A data storage system, comprising control circuitry that includes a set of processing units coupled to memory, the control circuitry constructed and arranged to:
   in response to receiving a first IO request specifying first data to be written to the data storage system, (i) execute, by a first thread running on a CPU (Central Processing Unit) core in the data storage system, a first set of instructions for performing initial processing of the first IO request and (ii) after executing the first set of instructions and in response to a core-busyness indicator having a first value, execute, by the first thread, a second set of instructions for performing further processing of the first IO request; and
   in response to receiving a second IO request specifying second data to be written to the data storage system, (i) execute, by the first thread, the first set of instructions for performing the initial processing of the second IO request and (ii) after executing the first set of instructions for the second IO request and in response to the core-busyness indicator having a second value, execute, by a second thread on the CPU core, the second set of instructions for performing the further processing of the second IO request, wherein the second value of the core-busyness indicator indicates a greater degree of busyness of the CPU core than does the first value of the core-busyness indicator, and wherein the control circuitry constructed and arranged to execute the second set of instructions by the second thread on the CPU core is further constructed and arranged to perform context switching from the first thread to the second thread when the core-busyness indicator indicates the greater degree of busyness, the context switching enabling the CPU core to operate more efficiently than it would without context switching, wherein the control circuitry is further constructed and arranged, in response to receiving the second IO request, to perform a decision operation by the first thread, the decision operation configured to direct execution of the second set of instructions by one of the first thread and the second thread based on the core-busyness indicator, wherein the control circuitry is further constructed and arranged to generate the core-busyness indicator based on a set of heuristics pertaining to a busyness of the CPU core, wherein the core-busyness indicator is generated by a third thread running on the CPU core, the third thread configured to obtain the set of heuristics by monitoring activity of the CPU core, and wherein the set of heuristics includes a number of IO requests currently being processed by the CPU core.

9. A computer program product including a set of non-transitory, computer-readable media having instructions which, when executed by control circuitry of a data storage system, cause the control circuitry to perform a method for processing IO (Input/Output) requests, the method comprising:

in response to receiving a first IO request specifying first data to be written to the data storage system, (i) executing, by a first thread running on a CPU (Central Processing Unit) core in the data storage system, a first set of instructions for performing initial processing of the first IO request and (ii) after executing the first set of instructions and in response to a core-busyness indicator having a first value, executing, by the first thread, a second set of instructions for performing further processing of the first IO request; and in response to receiving a second IO request specifying second data to be written to the data storage system, (i) executing, by the first thread, the first set of instructions for performing the initial processing of the second IO request and (ii) after executing the first set of instructions for the second IO request and in response to the core-busyness indicator having a second value, executing, by a second thread on the CPU core, the second set of instructions for performing the further processing of the second IO request, wherein the second value of the core-busyness indicator indicates a greater degree of busyness of the CPU core than does the first value of the core-busyness indicator, and wherein executing the second set of instructions by the second thread on the CPU core involves context switching from the first thread to the second thread when the core-busyness indicator indicates the greater degree of busyness, the context switching enabling the CPU core to operate more efficiently than it would without context switching, and wherein the method further comprises, in response to receiving the second IO request, performing a decision operation by the first thread, the decision operation configured to direct execution of the second set of instructions by one of the first thread and the second thread based on the core-busyness indicator, wherein the method further comprises generating the core-busyness indicator based on a set of heuristics pertaining to a busyness of the CPU core, wherein the core-busyness indicator is generated by a third thread running on the CPU core, the third thread obtaining the set of heuristics by monitoring activity of the CPU core, and wherein the set of heuristics includes a number of IO requests currently being processed by the CPU core.

10. The computer program product of claim 9, wherein the method further comprises, upon performing the decision operation with the core-busyness indicator having the second value, directing execution of the second set of instructions by the second thread by placing an indicator of the second IO request onto a queue accessible by the second thread, to enable the second thread to obtain the indicator of the second IO request from the queue and to execute the second set of instructions for the second IO request.

11. The computer program product of claim 10, wherein the method further comprises:

receiving additional IO requests each specifying a write of respective data to the data storage system;

executing the first set of instructions by the first thread for each of the additional IO requests; and in response to the busyness indicator having the second value, (i) placing indicators for the additional IO requests onto the queue and (ii) obtaining the indicators from the queue by multiple additional threads to enable the additional threads to execute the second set of instructions for the additional IO requests.

12. The computer program product of claim 11, wherein the acts of (i) placing, by the first thread, the indicators for the additional IO requests onto the queue and (ii) obtaining, by the additional threads, the indicators from the queue are performed asynchronously, such that, over a given time interval, a first rate at which the first thread places the indicators onto the queue differs from a second rate at which the additional threads obtain the indicators from the queue.

13. The computer program product of claim 10, wherein the method further comprises:

receiving additional IO requests each specifying a write of respective data to the data storage system; and in response to the busyness indicator having the first value, executing, by the first thread, both the first set of instructions and the second set of instructions for each of the additional IO requests.

* * * * *